(12) United States Patent
Barany et al.

(10) Patent No.: US 10,741,985 B2
(45) Date of Patent: Aug. 11, 2020

(54) MODULAR RF DEVICES

(71) Applicant: PPC BROADBAND, INC., East Syracuse, NY (US)

(72) Inventors: David Barany, Syracuse, NY (US); Cameron James Adams, Camillus, NY (US); Noah P. Montena, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/251,062

(22) Filed: Jan. 17, 2019

(65) Prior Publication Data

US 2019/0221975 A1   Jul. 18, 2019

Related U.S. Application Data

(60) Provisional application No. 62/618,074, filed on Jan. 17, 2018.

(51) Int. Cl.
| | |
|---|---|
| *H01R 13/73* | (2006.01) |
| *H01R 25/00* | (2006.01) |
| *H01R 24/52* | (2011.01) |
| *H04N 7/10* | (2006.01) |
| *H04L 12/28* | (2006.01) |
| *H01R 103/00* | (2006.01) |

(52) U.S. Cl.
CPC ........... *H01R 25/006* (2013.01); *H01R 24/52* (2013.01); *H04L 12/2801* (2013.01); *H04N 7/104* (2013.01); *H01R 2103/00* (2013.01); *H01R 2201/04* (2013.01)

(58) Field of Classification Search
CPC  H01R 25/006; H01R 23/7073; H01R 13/748; H01R 2103/00; H01R 13/514; H03H 7/48
USPC ..... 439/535, 564, 581, 701, 541.5; 333/100, 333/131
See application file for complete search history.

(56) References Cited

U.S. PATENT DOCUMENTS

| | | | | |
|---|---|---|---|---|
| 5,675,300 | A | * | 10/1997 | Romerein .......... H01R 13/6658 333/100 |
| 6,302,723 | B1 | * | 10/2001 | Baum ...................... H01C 7/12 439/412 |
| 6,790,049 | B2 | * | 9/2004 | Kaylie ................. H05K 9/0056 333/100 |
| 6,969,278 | B2 | * | 11/2005 | Shapson ................ H01R 27/02 333/100 |

(Continued)

*Primary Examiner* — Thanh Tam T Le
(74) *Attorney, Agent, or Firm* — MH2 Technology Law Group, LLP

(57) ABSTRACT

A modular passive RF apparatus includes a passive RF portal and a passive RF expansion module configured to be removably coupled with the passive RF portal. A male connector is configured to extend from a top surface of the passive RF portal, and a female connector is configured to extend from the first end wall of the passive RF expansion portal. The female connector is configured to slidingly engage the male connector in a direction parallel to the top surface of the passive RF portal in order to mechanically couple the passive RF expansion module with the passive RF portal, and the male connector is configured to prevent the female connector from being removed from the male connector in a direction perpendicular to the top surface of the passive RF portal.

20 Claims, 16 Drawing Sheets

(56) References Cited

U.S. PATENT DOCUMENTS

| | | | | |
|---|---|---|---|---|
| 7,182,638 | B2 * | 2/2007 | Mahoney | H01R 9/16 |
| | | | | 439/564 |
| 7,234,967 | B2 * | 6/2007 | Weidner | H01R 9/0515 |
| | | | | 439/581 |
| D607,414 | S * | 1/2010 | Egan | D13/151 |
| 7,701,309 | B2 * | 4/2010 | Shapson | H01R 24/42 |
| | | | | 333/100 |
| 7,709,753 | B1 * | 5/2010 | Russo | H01R 9/2458 |
| | | | | 174/135 |
| 7,830,225 | B2 * | 11/2010 | Gale | H01R 24/547 |
| | | | | 333/125 |
| 7,974,586 | B2 * | 7/2011 | Romerein | H03H 7/463 |
| | | | | 455/127.1 |
| 8,759,676 | B1 * | 6/2014 | Gretz | H02G 3/185 |
| | | | | 174/50 |
| 8,764,487 | B2 * | 7/2014 | Ballard | H01R 13/6215 |
| | | | | 439/607.47 |
| 8,777,676 | B1 * | 7/2014 | Mortun | H01R 25/142 |
| | | | | 439/701 |
| 8,920,193 | B2 * | 12/2014 | Riggsby | H01R 9/05 |
| | | | | 439/578 |
| 9,795,043 | B2 * | 10/2017 | Li | H05K 9/0039 |
| 10,403,949 | B2 * | 9/2019 | Grassl | H01P 1/2053 |

* cited by examiner

MODULAR RF DEVICES

CROSS-REFERENCE TO RELATED APPLICATION

This nonprovisional application claims the benefit of U.S. Provisional Application No. 62/618,074, filed Jan. 17, 2018. The disclosure of the prior application is hereby incorporated by reference herein in its entirety.

BACKGROUND

Conventional radio frequency (RF) devices, for example, amplifiers and splitters, include one input and a finite number of outputs. When a user requires more than the finite number of outputs provided on the RF device, the user is required to add a discrete additional device to add capability to the RF device. Alternatively, the user can replace the RF device with a larger RF device having a greater number of outputs that meets the user's needs. When replacing the RF device, the existing connections must be disrupted.

Also, in order to minimize a spatial footprint occupied by the RF device, user's will prefer to have a compact RF device that does not include an unnecessary number of output ports that will likely never be used. Further, larger devices with more output ports will be more expensive. Thus, in order to cover a large range of user needs, suppliers and installers would need to maintain an inventory that includes numerous sized RF devices with different numbers of ports to accommodate all users, which increases inventory costs.

Some passive RF devices provide cable network connectivity to broadband devices, such as a DVR and modem, while connecting MoCA (Multimedia over Coax Alliance) devices to the DVR through an isolated internal network. Such passive RF devices typically include an input port and a fixed number of output ports. Some of the output ports may be configured for connection with broadband device, while other ones of the output ports may be configured for connection with MoCA devices only.

As discussed above, when a user requires more ports than are provided on the RF device, the user must either replace the RF device with a usually larger device that includes more output ports or connect one of the output ports of the RF device to an expansion module that provides additional output ports. In either case, the spatial footprint occupied by the larger RF device or by expansion module is increased. For example, if the RF device is attached to a mounting panel or to a wall, additional space on the mounting panel or the wall is occupied by the larger RF device or the expansion module.

It may be desirable to provide a modular RF device that permits a user to expand the number of outputs by adding a modular unit in a manner that minimizes an increase in the spatial footprint while allowing easy access to all of the ports of the modular RF device. It may further be desirable to provide a modular device that includes interlocking modular units that can be secured together to create an integrated larger functional block. Further is may be desirable to provide a modular device that permits an existing user to upgrade a passive RF device by merely adding an expansion module without disrupting existing connections, thereby saving time and reducing customer inventory costs by eliminating the need to stock quantities of multiple sizes of RF devices.

SUMMARY

In accordance with some embodiments of the disclosure, a modular passive MoCA apparatus is configured to provide cable network connectivity to broadband devices, while connecting MoCA devices to the broadband devices. The apparatus includes a passive RF portal that includes an input port configured to receive a cable that provides cable network connectivity and a plurality of output ports configured to receive cables that provide electrical connectivity with the broadband devices and the MoCA devices and a passive RF expansion module configured to be removably coupled with the passive RF portal.

In some aspects, the passive RF expansion module includes an input port configured to receive a cable that provides electrical connectivity with one of the plurality of output ports of the passive RF portal and a plurality of output ports configured to receive cables that provide electrical connectivity with additional MoCA devices.

According to various aspects, the input port and the plurality of output ports of the passive RF portal extend from a front surface of the passive RF portal, and the input port and the plurality of output ports of the passive RF expansion module extend from a front surface of the passive RF expansion module.

In various aspects, the passive RF portal includes a top surface and a bottom surface extending from a first pair of opposite ends of the front surface of the passive RF portal, the top surface and the bottom surface of the passive RF portal extending perpendicular to the front surface of the passive RF portal.

According to some aspects, the bottom surface of the passive RF portal is configured to face a surface of a structure when the passive RF portal is attached to the structure.

According to various aspects, a male connector is configured to extend from the top surface of the passive RF portal, the male connector including a stem that is configured to extend from the top surface of the passive RF portal and is terminated by an enlarged head.

In some aspects, the passive RF expansion module includes a top surface and a bottom surface extending from a first pair of opposite ends of the front surface of the passive RF expansion module, the top surface and the bottom surface of the passive RF expansion module extending perpendicular to the front surface of the passive RF expansion module.

In various aspects, the passive RF expansion module includes a first end wall and a second end wall extending from a second pair of opposite ends of the front surface of the passive RF expansion module, the first end wall and the second end wall of the passive RF expansion module extending perpendicular to the front surface, the top surface, and the bottom surface of the passive RF expansion module.

According to some aspects, a flange having a U-shaped notch that forms a female connector is configured to extend from the first end wall of the passive RF expansion portal proximate with and parallel to the bottom surface of the passive RF expansion module.

In various aspects, the female connector is configured to slidingly engage the stem of the male connector in a direction parallel to the top surface of the passive RF portal in order to mechanically couple the passive RF expansion module with the passive RF portal, and the head of the male connector is configured to prevent the female connector from being removed from the male connector in a direction perpendicular to the top surface of the passive RF portal.

In some aspects, the passive RF portal includes a first end wall and a second end wall extending from a second pair of opposite ends of the front surface of the passive RF portal, the first end wall and the second end wall of the passive RF portal extending perpendicular to the front surface, the top surface, and the bottom surface of the passive RF portal.

According to various aspects, a mounting portion is configured to extend from the second end wall of the passive RF portal proximate and parallel to the top surface of the passive RF portal.

According to some aspects, a second flange is configured to extend from the second end wall of the passive RF expansion module proximate with and parallel to the bottom surface of the passive RF expansion module.

In various aspects, the mounting portion and the second flange are configured to receive a fastener for fixedly coupling the passive RF expansion module to the passive RF portal.

According to various embodiments of the disclosure, a modular passive RF apparatus includes a passive RF portal that includes an input port configured to receive cable network connectivity and a plurality of output ports configured to provide electrical connectivity with a plurality of broadband devices and a plurality of MoCA devices and a passive RF expansion module configured to be removably coupled with the passive RF portal.

In some aspects, the passive RF expansion module includes an input port configured to receive electrical connectivity with one of the plurality of output ports of the passive RF portal and a plurality of output ports configured to provide electrical connectivity with additional MoCA devices.

According to various aspects, the input port and the plurality of output ports of the passive RF portal extend from a front surface of the passive RF portal, and the input port and the plurality of output ports of the passive RF expansion module extend from a front surface of the passive RF expansion module.

According to some aspects, the passive RF portal includes a top surface and a bottom surface that are parallel to one another and perpendicular to the front surface of the passive RF portal.

In various aspects, a male connector is configured to extend from the top surface of the passive RF portal.

According to various aspects, the passive RF expansion module includes a top surface and a bottom surface that are parallel to one another and perpendicular to the front surface of the passive RF expansion module.

In some aspects, the passive RF expansion module includes a first end wall and a second end wall that are parallel to one another and perpendicular to the front surface, the top surface, and the bottom surface of the passive RF expansion module.

According to some aspects, a female connector is configured to extend from the first end wall of the passive RF expansion portal.

In various aspects, the female connector is configured to slidingly engage the male connector in a direction parallel to the top surface of the passive RF portal in order to mechanically couple the passive RF expansion module with the passive RF portal, and the male connector is configured to prevent the female connector from being removed from the male connector in a direction perpendicular to the top surface of the passive RF portal.

In some embodiments of the disclosure, a modular passive RF apparatus includes a passive RF portal and a passive RF expansion module configured to be removably coupled with the passive RF portal. A male connector is configured to extend from a top surface of the passive RF portal, and a female connector is configured to extend from the first end wall of the passive RF expansion portal. The female connector is configured to slidingly engage the male connector in a direction parallel to the top surface of the passive RF portal in order to mechanically couple the passive RF expansion module with the passive RF portal, and the male connector is configured to prevent the female connector from being removed from the male connector in a direction perpendicular to the top surface of the passive RF portal.

DETAILED DESCRIPTION OF EMBODIMENTS

Figure 1:
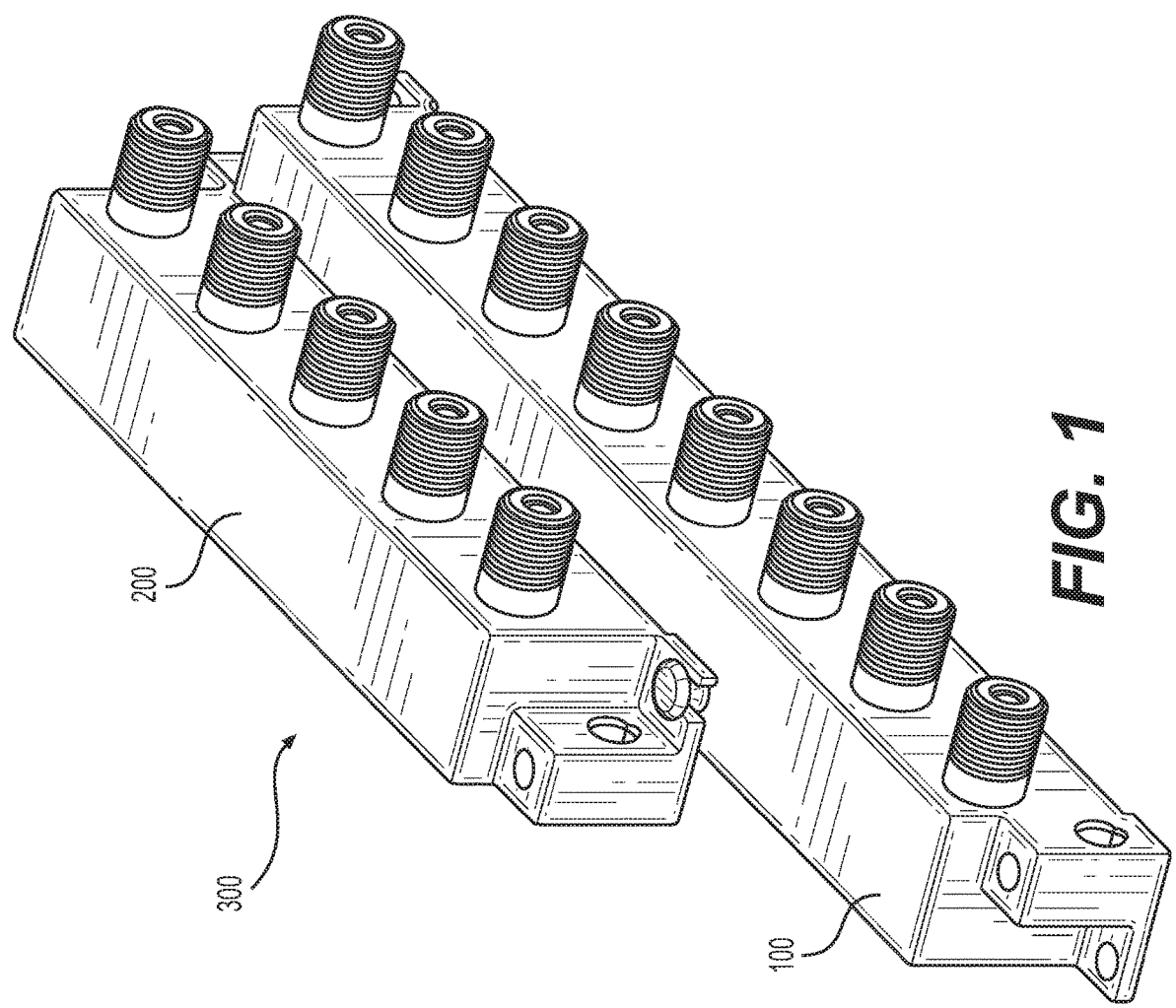
FIG. 1 is a perspective view of an exemplary modular RF device in accordance with various aspects of the disclosure.
Figure 2:
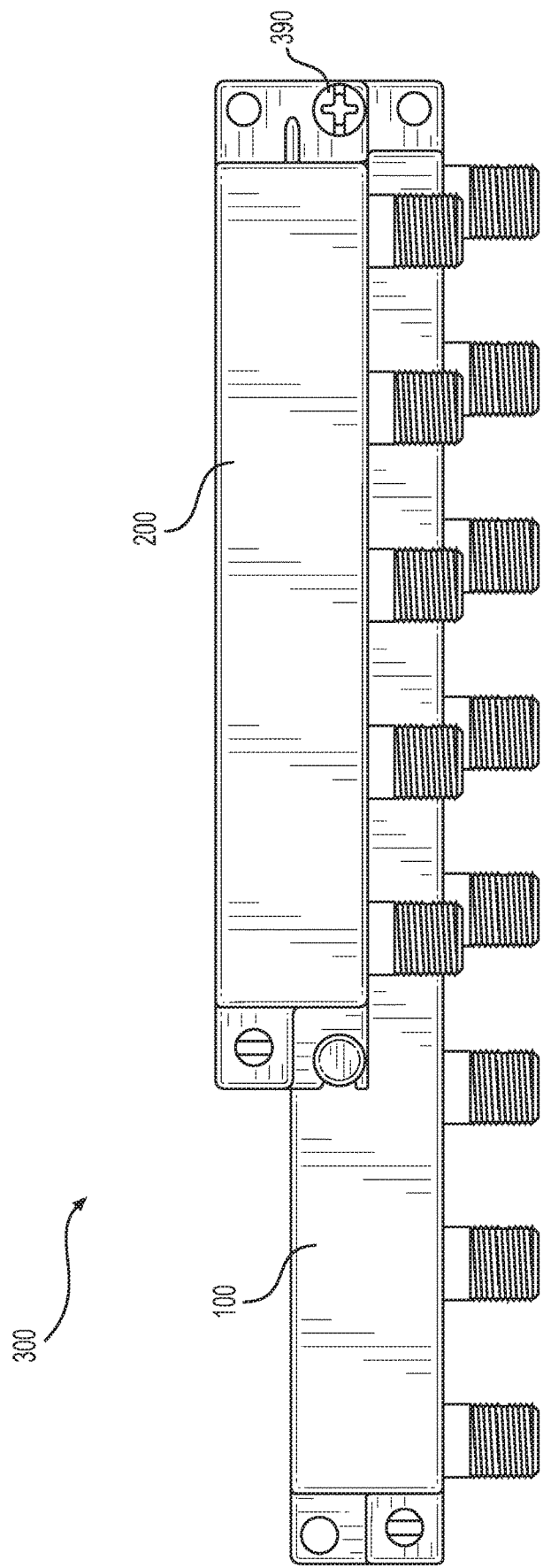
FIG. 2 is a top view of the modular RF device of FIG. 1.
Figure 3:
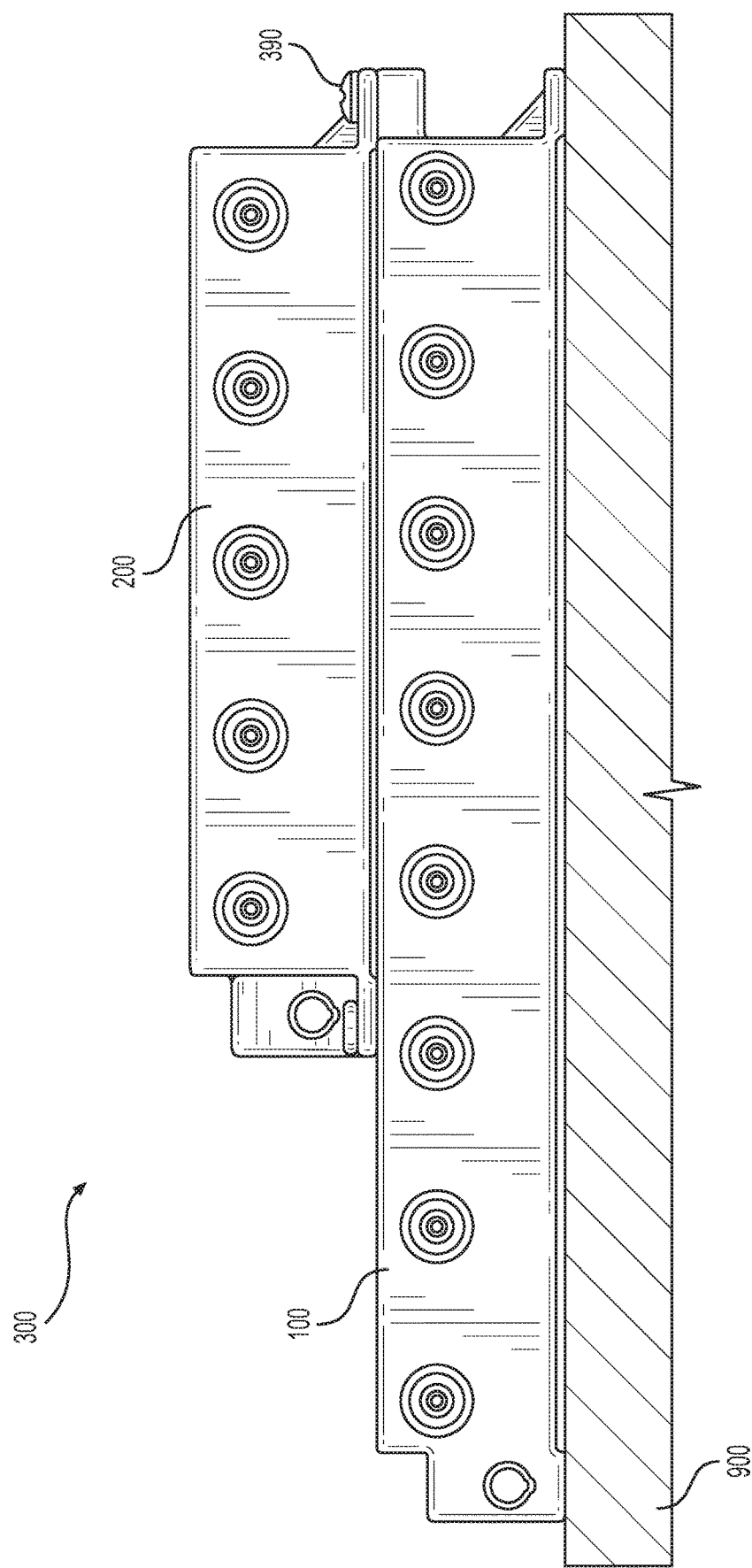
FIG. 3 is a front view of the modular RF device of FIG. 1.

FIGS. 1-3 illustrate a modular RF device 300 in a stacked configuration in accordance with an exemplary embodiment of the disclosure. According to various aspects, the modular RF device 300 is a passive MoCA apparatus, a passive RF splitter, or the like. The modular device 300 includes a passive RF portal 100 and a passive expansion module 200 in accordance with various aspects of the disclosure.

Figure 4:
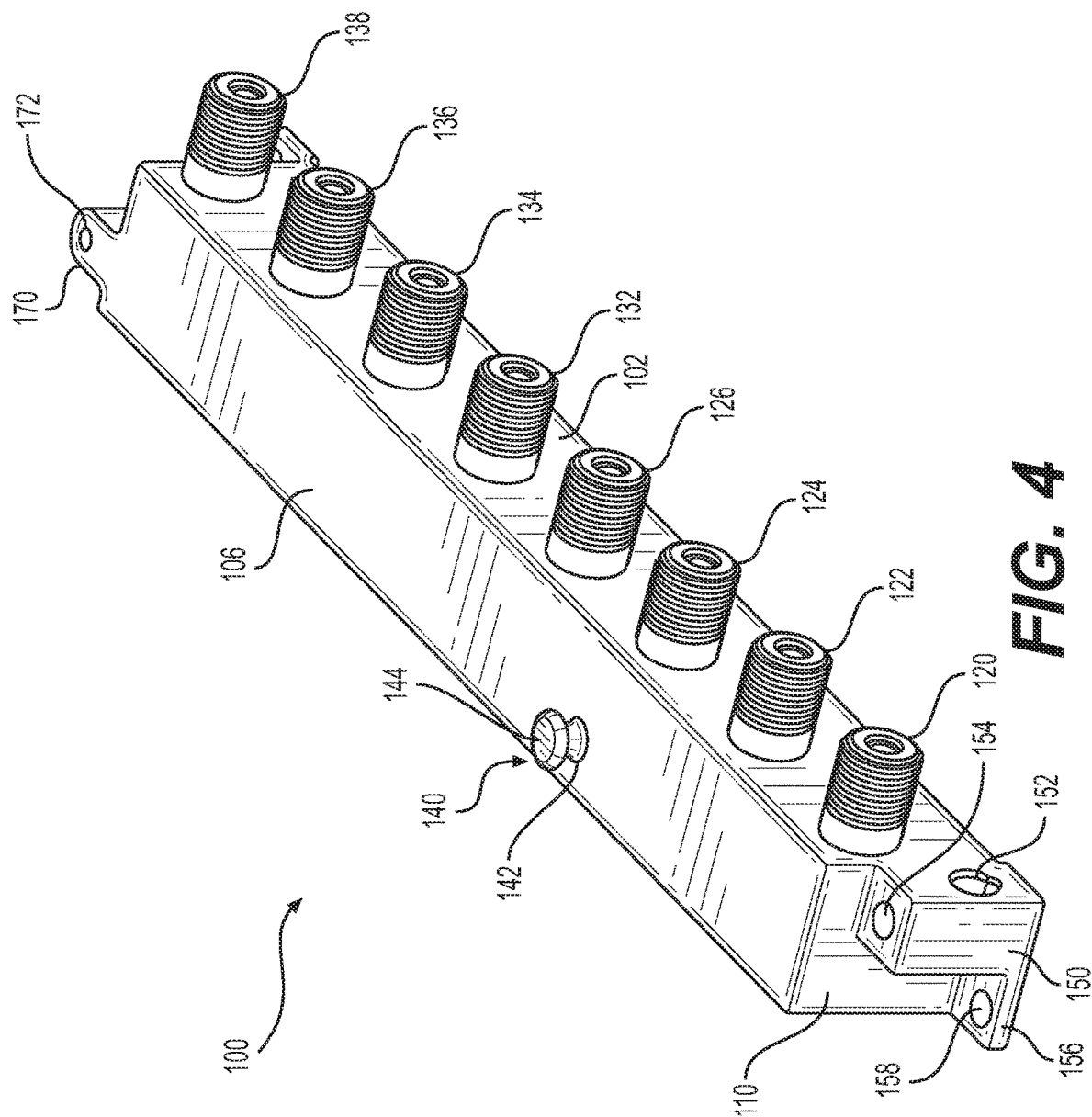
FIG. 4 is a perspective view of the passive portal of the modular RF device of FIG. 1.
Figure 5:
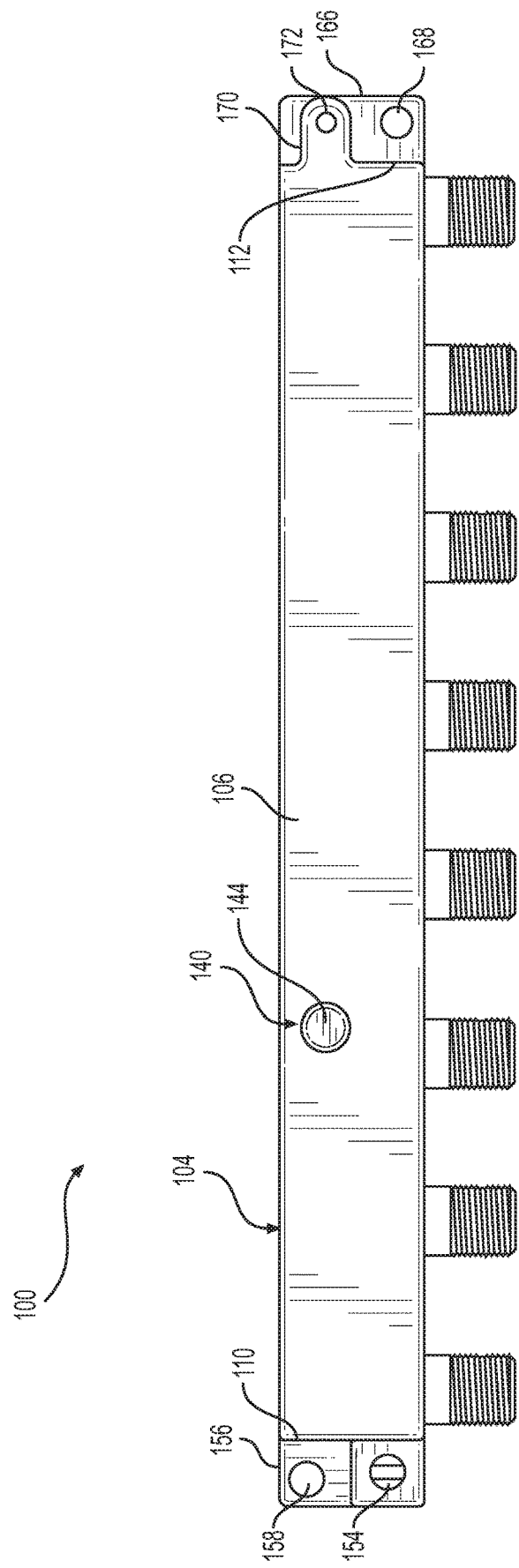
FIG. 5 is a top view of the passive portal of FIG. 4.
Figure 6:
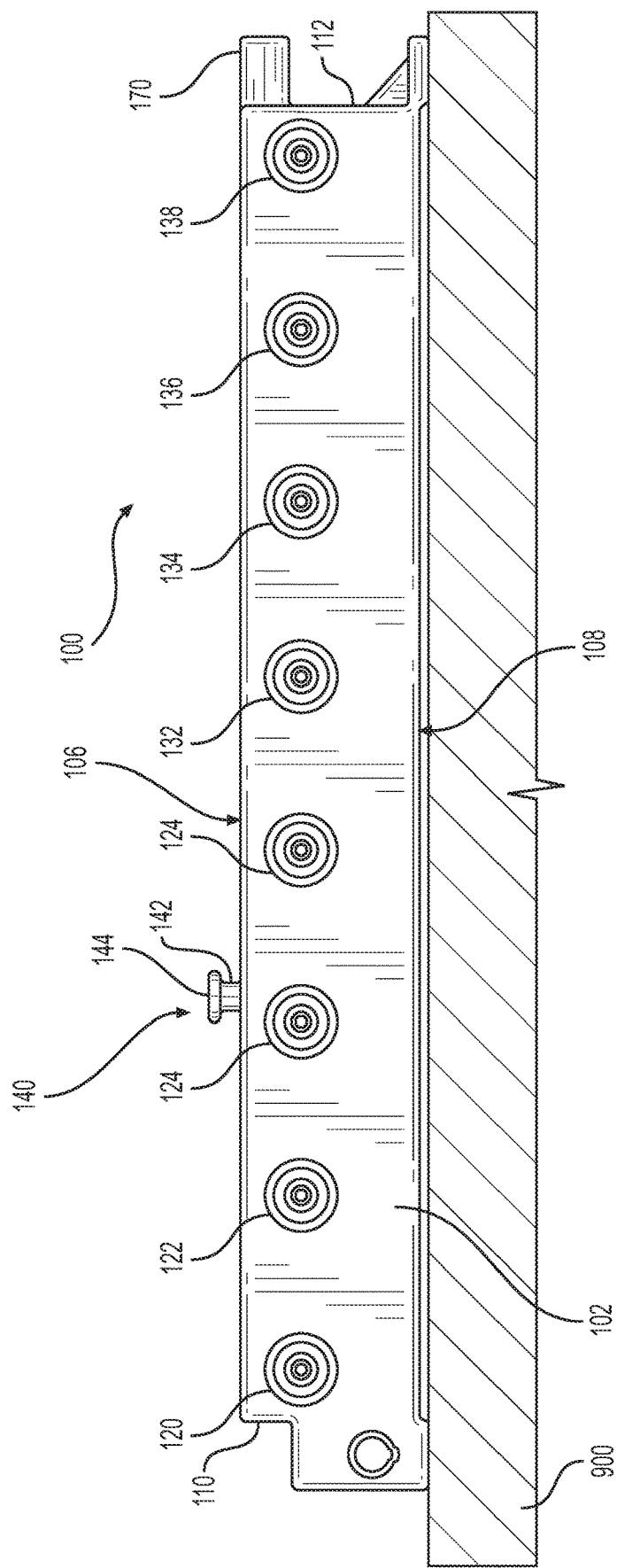
FIG. 6 is a front view of the passive portal of FIG. 4.

Referring to FIGS. 4-6, the passive RF portal 100 includes a front surface 102, a back surface 104, a top surface 106, and a bottom surface 108. The passive RF portal 100 also includes a first end wall 110 and an opposite second end wall 112. The front surface 102 includes a plurality of ports 120, 122, 124, 126, 132, 134, 136, 138 extending therefrom. According to various aspects of the disclosure, port 120 is configured as an input port, and ports 122, 124, 126, 132, 134, 136, 138 are configured as output ports. For example, ports 122, 124, 126 may be configured as access ports providing broadband and MoCA outputs, and ports 132, 134, 136, 138 may be configured as home ports providing MoCA-only outputs.

Figure 16:
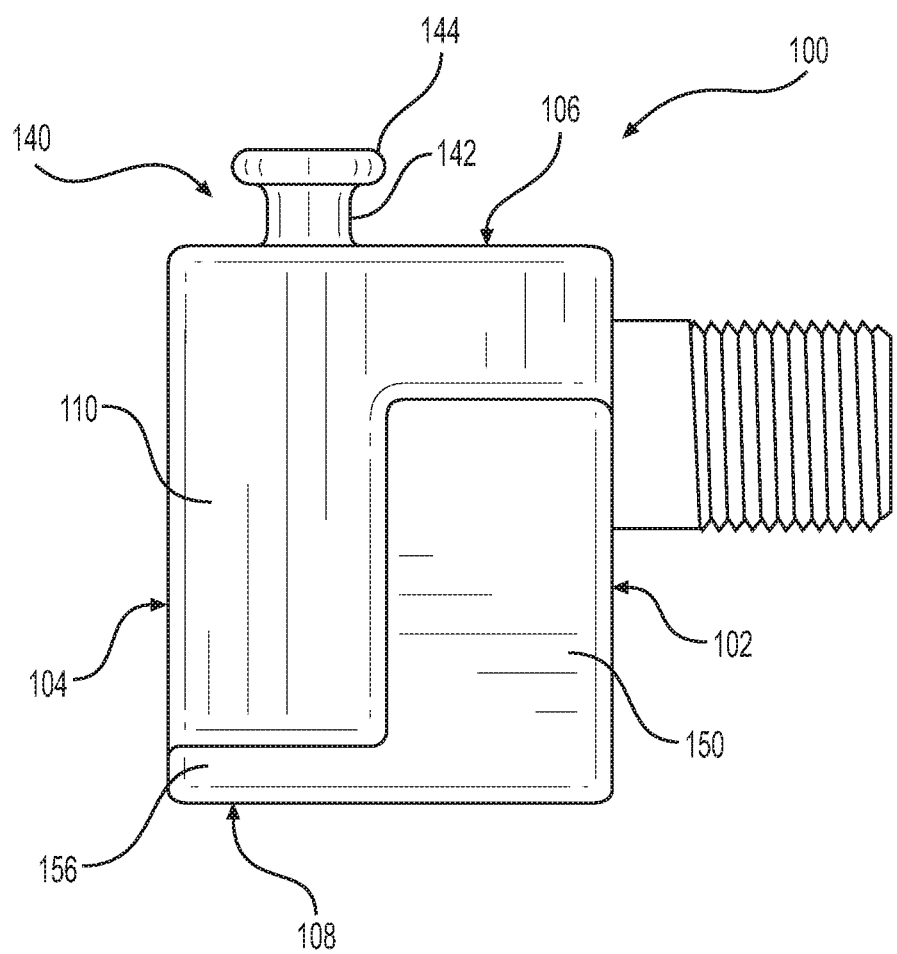
FIG. 16 is an end view of the passive portal of FIG. 4.

Referring now to FIG. 16, the top surface 106 includes a male connecting member 140 extending upward from the top surface 106. The male connecting member 140 includes a stem 142 with an enlarged head 144 at the end of the stem 142 opposite to the top surface 106.

As best illustrated in FIG. 4, the first end wall 110 includes a grounding portion 150 having a first opening 152 configured to receive a ground wire and a second opening 154 extending substantially perpendicular to the first opening 152 and configured to receive a fixing member, for example, a screw, that is threadedly received by the second opening 154. The second opening 154 extends into the first opening 152 so that the fixing member can fixedly couple the ground wire to the grounding portion 150.

A first flange portion 156 extends from the first end wall 110 proximate and parallel to the bottom surface 108. The first flange portion 156 includes an opening 158 configured to receive a fastener to secure the passive RF portal 100 to a structure 900, for example, a mounting panel, a wall, or the like. A second flange portion 166 extends from the second end wall 112 proximate and parallel to the bottom surface 108. The second flange portion 166 may include an opening 168 configured to receive a fastener to secure the passive RF portal 100 to the aforementioned structure. A mounting portion 170 extends from the second end wall 112 proximate and parallel to the top surface 106. The mounting portion 170 includes an opening 172, for example, a threaded opening, configured to receive a threaded fastener. In some aspects, the opening 172 may be unthreaded, and the fastener may thread itself into the opening 172.

Figure 7:
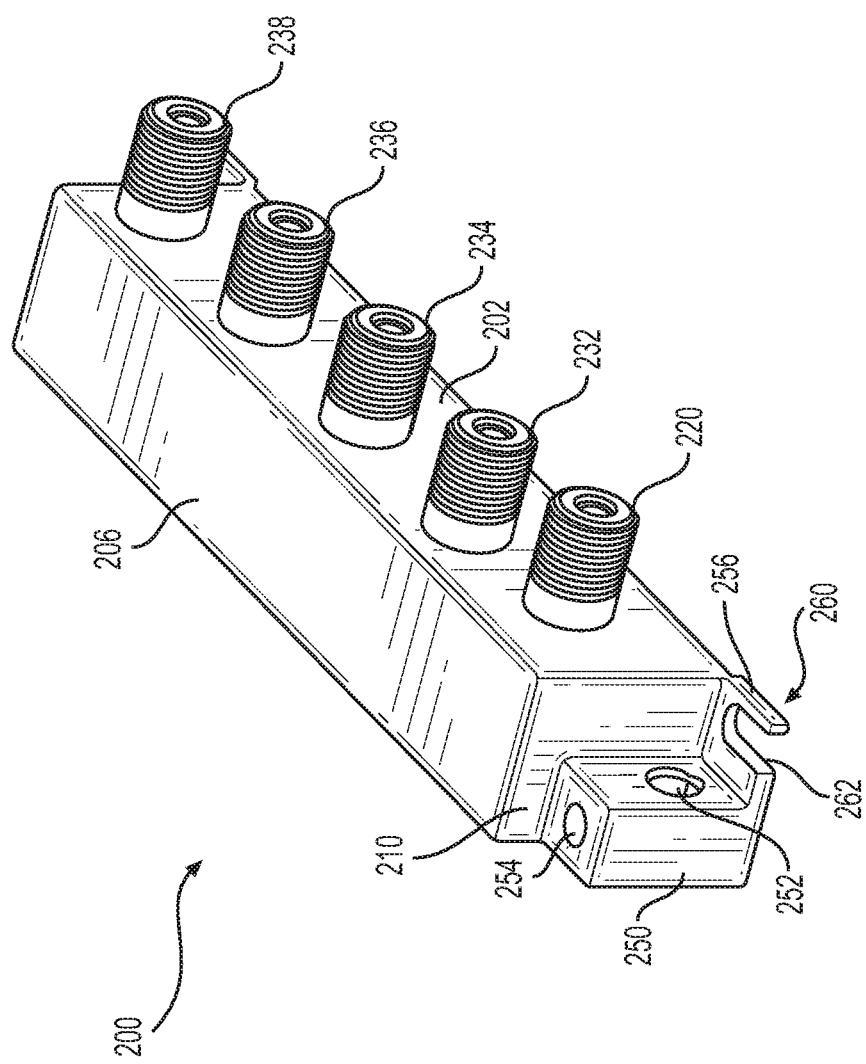
FIG. 7 is a perspective view of the passive expansion module of the modular RF device of FIG. 1.
Figure 8:
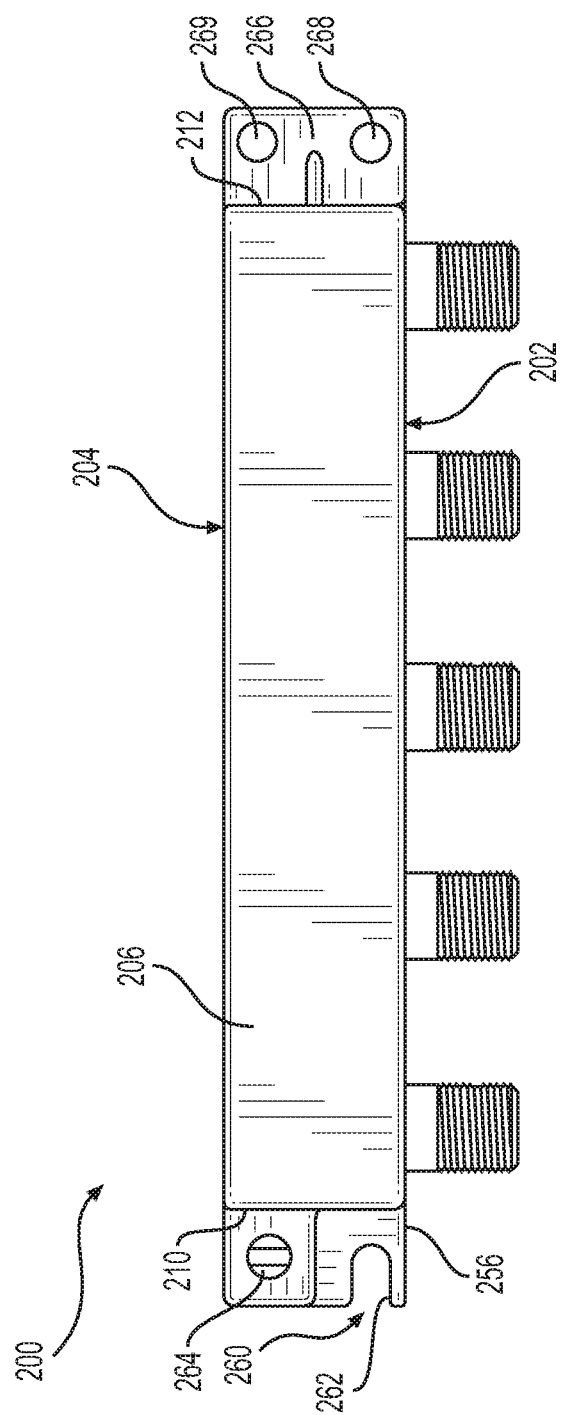
FIG. 8 is a top view of the passive expansion module of FIG. 7.
Figure 9:
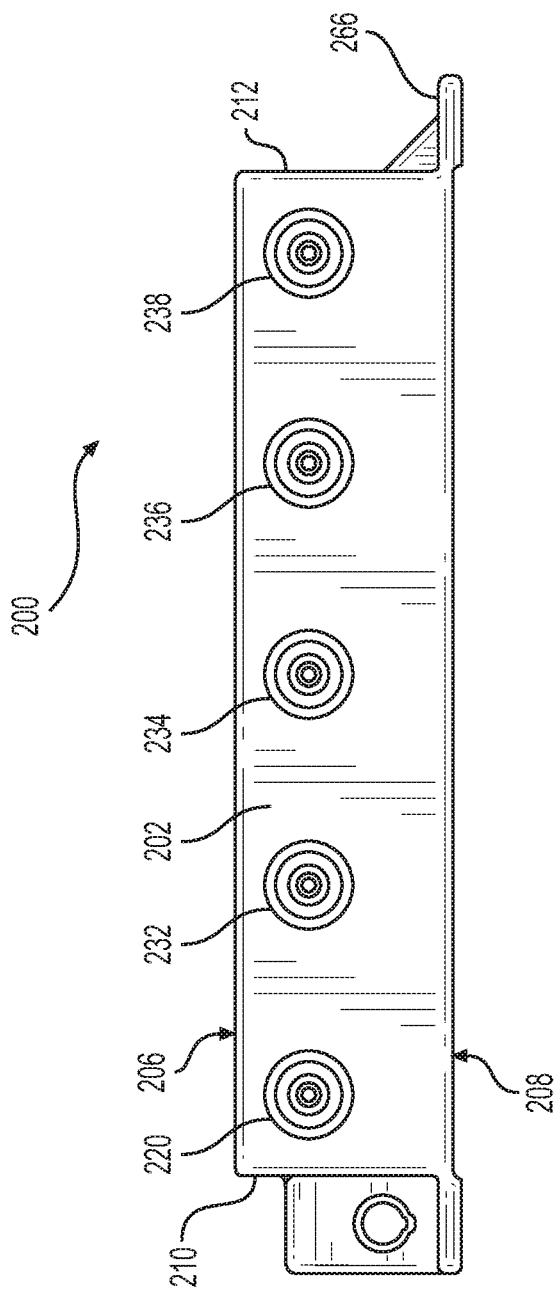
FIG. 9 is a front view of the passive expansion module of FIG. 7.

Referring now to FIGS. 7-9, the passive expansion module 200 includes a front surface 202, a back surface 204, a top surface 206, and a bottom surface 208. The passive expansion module 200 also includes a first end wall 210 and an opposite second end wall 212. The front surface 202 includes a plurality of ports 220, 232, 234, 236, 238 extending therefrom. According to various aspects of the disclosure, port 220 is configured as an input port, and ports 232, 234, 236, 238 are configured as output ports. For example, ports 232, 234, 236, 238 may be home ports providing MoCA-only outputs.

As best illustrated in FIGS. 7 and 8, a first flange portion 256 extends from the first end wall 210 proximate and parallel to the bottom surface 208. The first flange portion 256 includes a female connecting member 260. The female connecting member 260 includes a U-shaped notch 262 that is sized to receive the stem 142 of the male connecting member 140 of the passive portal 100, but is sized smaller than the enlarged head 144. The female connecting member 260 is configured to be coupled with the stem 142 of the male connecting member 140 by sliding the female connecting member 260 in a direction orthogonal to the direction in which the stem 142 extends from the top surface 106. The head 144 of the male connecting member 140 of the passive portal 100 is sized to be larger than the U-shaped notch 262 such that the female connecting member 260 must be slidingly removed from the connecting member 140 and cannot be removed from the male connecting member 140 by moving the female connector in the direction in which the stem 142 extends.

In some aspects, the first end wall 210 also includes a grounding portion 250 having a first opening 252 configured to receive a ground wire and a second opening 254 extending substantially perpendicular to the first opening 252 and configured to receive a fixing member, for example, a screw, that is threadedly received by the second opening 254. The second opening 254 extends into the first opening 252 so that the fixing member can fixedly couple the ground wire to the grounding portion 250.

A second flange portion 266 extends from the second end wall 212 proximate and parallel to the bottom surface 208. The second flange portion 266 includes openings 268, 269 configured to receive fasteners, for example, to secure the passive expansion module to a structure.

Referring again to FIGS. 1-3, the modular RF device 300 includes the passive portal 100 and the passive expansion module 200 coupled together. For example, the passive expansion module 200 is coupled to the passive portal 100 by coupling the female connecting member 260 of the passive expansion module 200 with the male connecting member 140 of the passive portal 100. That is, the U-shaped notch 262 of the female connecting member 260 is coupled with the stem 142 of the male connecting member 140 by sliding the female connecting member 260 in a direction orthogonal to the direction in which the stem 142 extends. The head 144 of the male connecting member 140 of the passive portal 100 is larger than the U-shaped notch 262 such that the female connecting member 260 cannot be removed from the male connecting member 140 by moving the female connector in the direction in which the stem 142 extends from the top surface 106.

When the passive expansion module 200 is coupled to the passive portal 100 by coupling the female connecting member 260 of the passive expansion module 200 with the male connecting member 140 of the passive portal 100, the opening 268 of the second flange portion 266 of the passive expansion module 200 is aligned with the opening 172 of the mounting portion 170 that ends from the second end wall 112 of the passive portal 100. A fastener 390, for example, a screw, can be inserted through the opening 268 and screwed into the threaded opening 172 of the mounting portion 170, thereby fixedly coupling the passive expansion module 200 to the passive portal 100. In some aspects, the opening 172 may be unthreaded, and the fastener may thread itself into the opening 172.

In order to electrically couple the passive expansion module 200 with the passive portal 100, an interconnecting cable (not shown) is run from one of the output ports 122, 124, 126, 132, 134, 136, 138 of the passive portal 100 to the input port 220 of the passive expansion module 200. Thus, the one port used for the interconnecting cable is sacrificed in exchange for four additional ports. As a result, the modular RF device 300 provides a total of ten output ports, six from the passive portal 100 and four from the passive expansion module 200.

Referring now to FIGS. 10-14, another modular RF device 1300 in accordance with an exemplary embodiment of the disclosure is illustrated. The modular device 1300 includes the passive RF portal 100 and two passive expansion modules 1200 in accordance with various aspects of the disclosure.

Each of the passive expansion modules 1200 includes a front surface 1202, a back surface 1204, a top surface 1206, and a bottom surface 1208. Each passive expansion module 1200 also includes a first end wall 1210 and an opposite second end wall 1212. The front surface 1202 includes a plurality of ports 1220, 1232, 1234, 1236, 1238 extending therefrom. According to various aspects of the disclosure, port 1220 is configured as an input port, and ports 1232, 1234, 1236, 1238 are configured as output ports. For example, ports 1232, 1234, 1236, 1238 may be home ports providing only MoCA outputs.

Figure 10:
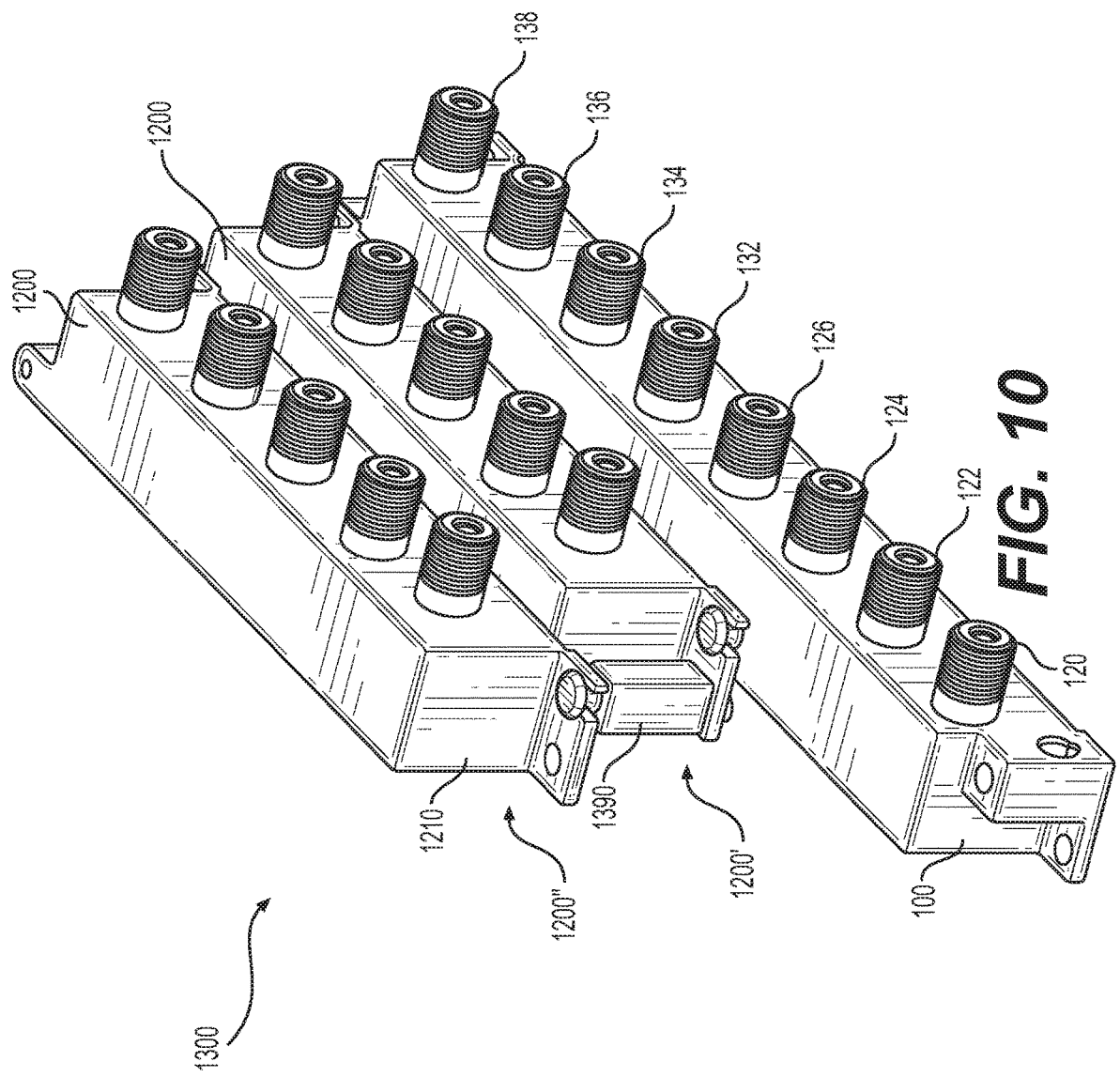
FIG. 10 is a first perspective view of another exemplary modular RF device in accordance with various aspects of the disclosure.
Figure 11:
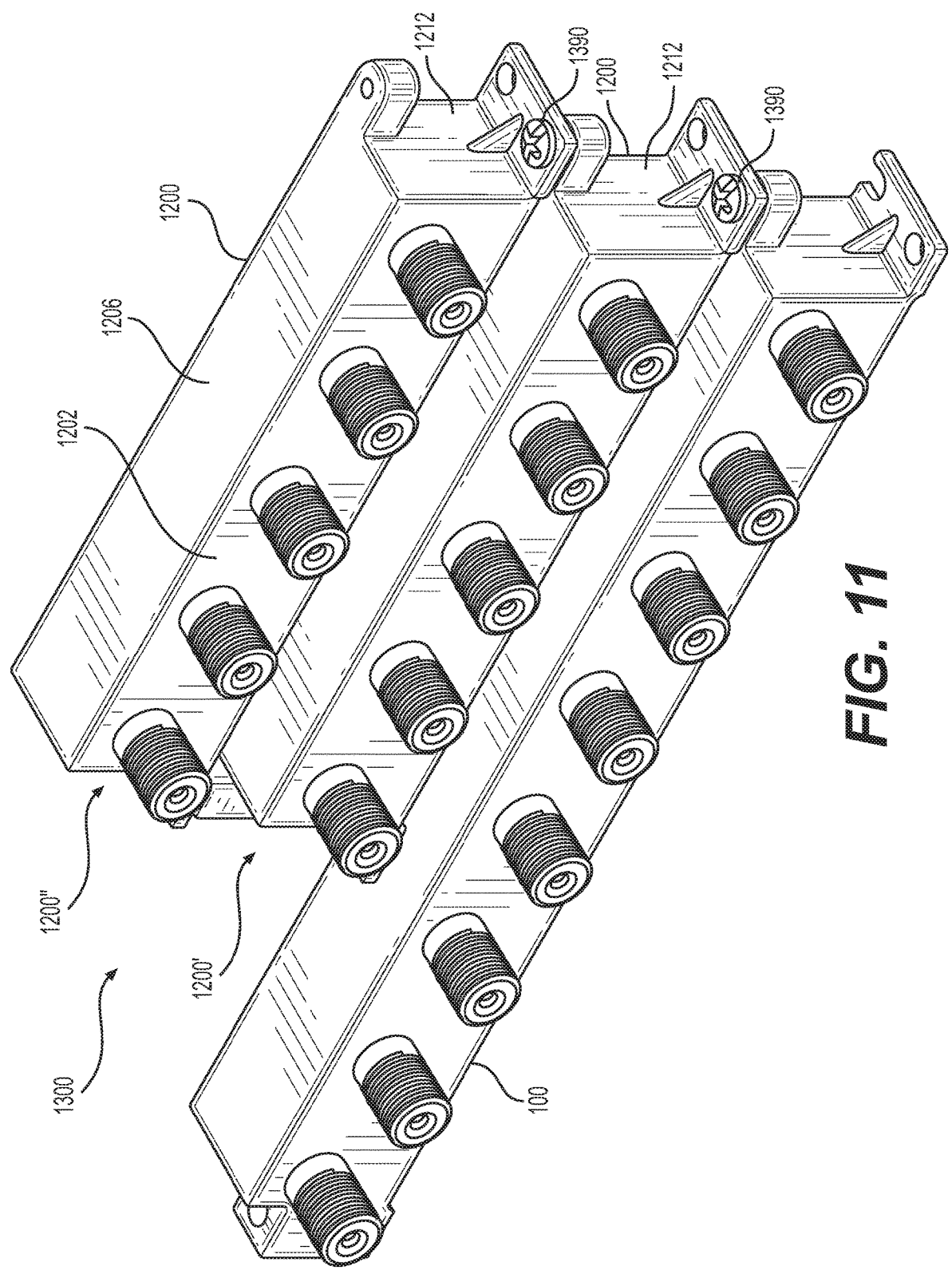
FIG. 11 is a second perspective view of the modular RF device of FIG. 10.

As best illustrated in FIG. 10, a first flange portion 1256 extends from the first end wall 1210 proximate and parallel to the bottom surface 1208. The first flange portion 1256 includes a female connecting member 1260. The female connecting member 1260 includes a U-shaped notch 1262 that is sized to receive the stem 142 of the male connecting member 140 of the passive portal 100, but is sized smaller than the enlarged head 144. The female connecting member 1260 is configured to be coupled with the stem 142 of the male connecting member 140 by sliding the female connecting member 1260 in a direction orthogonal to the direction in which the stem 142 extends from the top surface 106. The head 144 of the male connecting member 140 of the passive portal 100 is sized to be larger than the U-shaped notch 1262 such that the female connecting member 1260 must be slidingly removed from the connecting member 140 and cannot be removed from the male connecting member 140 by moving the female connector in the direction in which the stem 142 extends.

The first flange portion 1256 also includes an opening 1264 in the first flange portion 1256. The opening 1264 is configured to receive a fastener, for example, to secure the passive expansion module 1200 to a structure.

Figure 12:
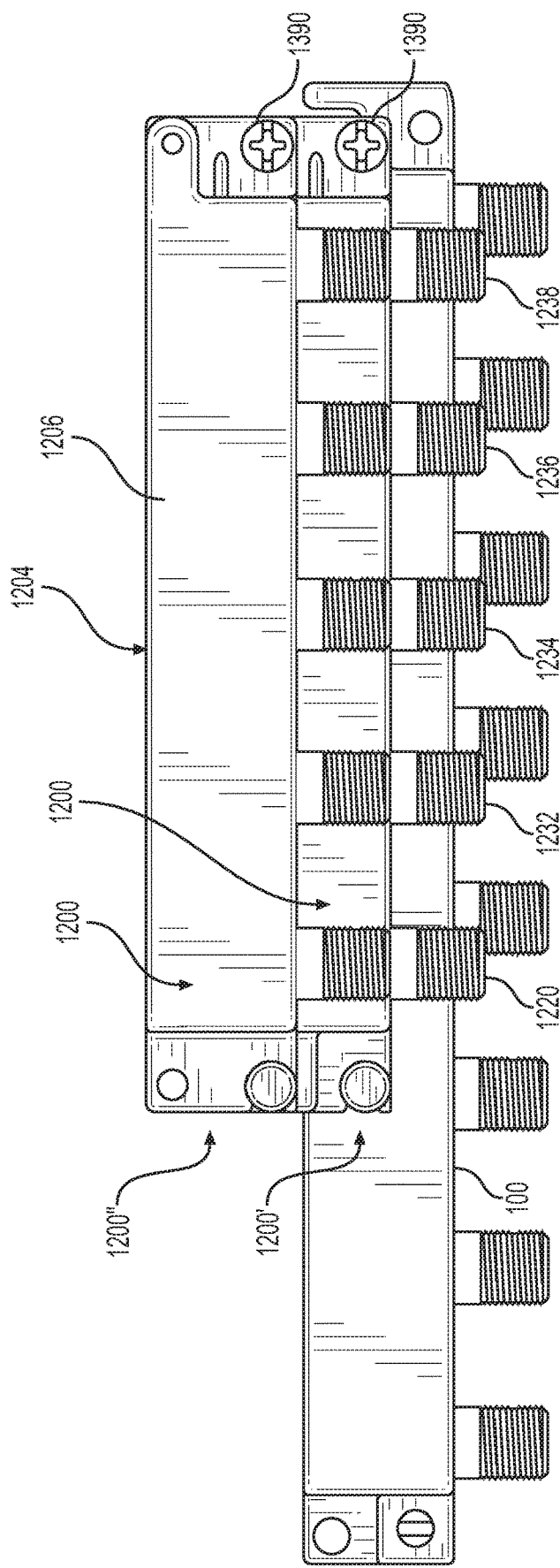
FIG. 12 is a top view of the modular RF device of FIG. 10.
Figure 13:
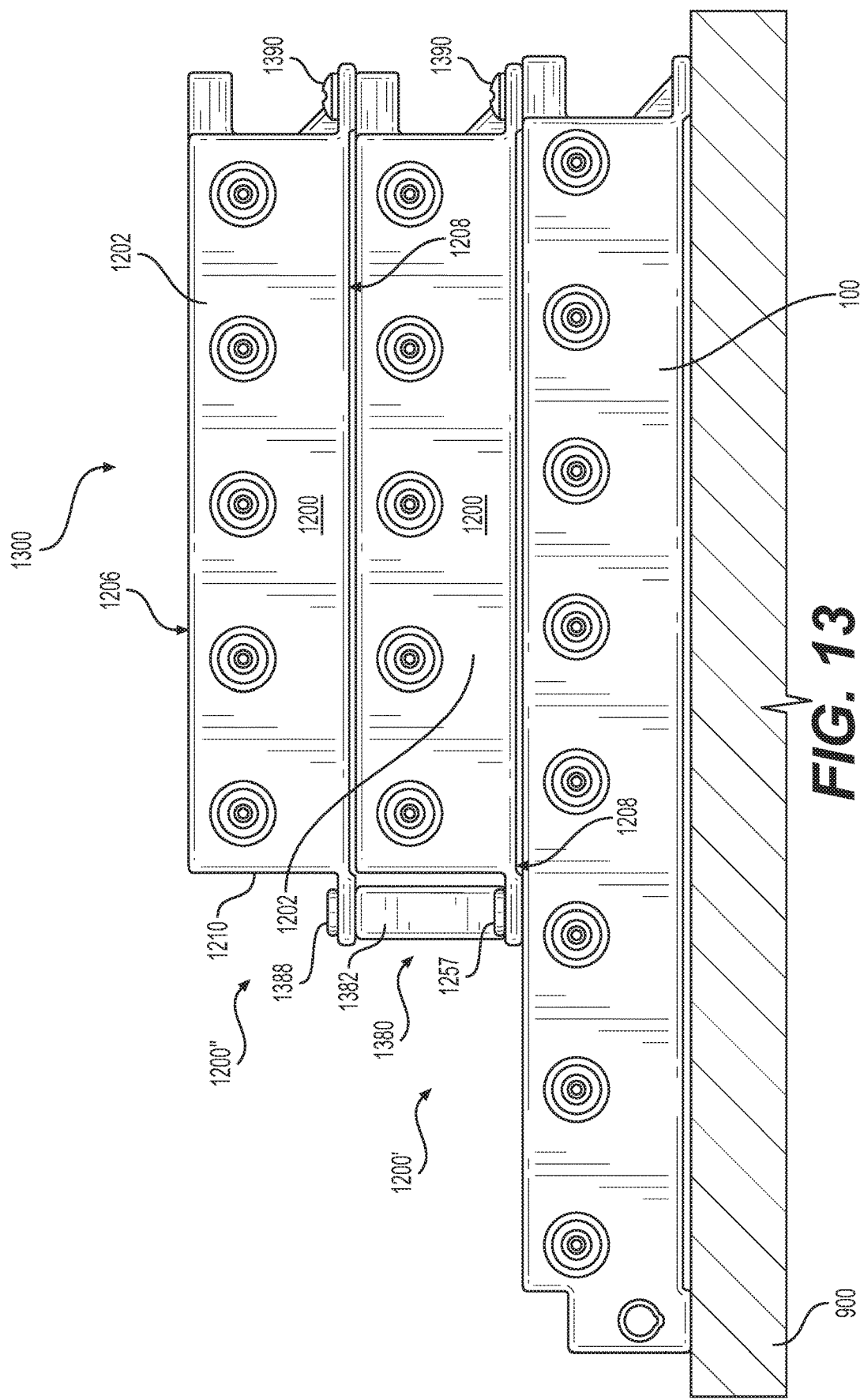
FIG. 13 is a front view of the modular RF device of FIG. 10.
Figure 14:
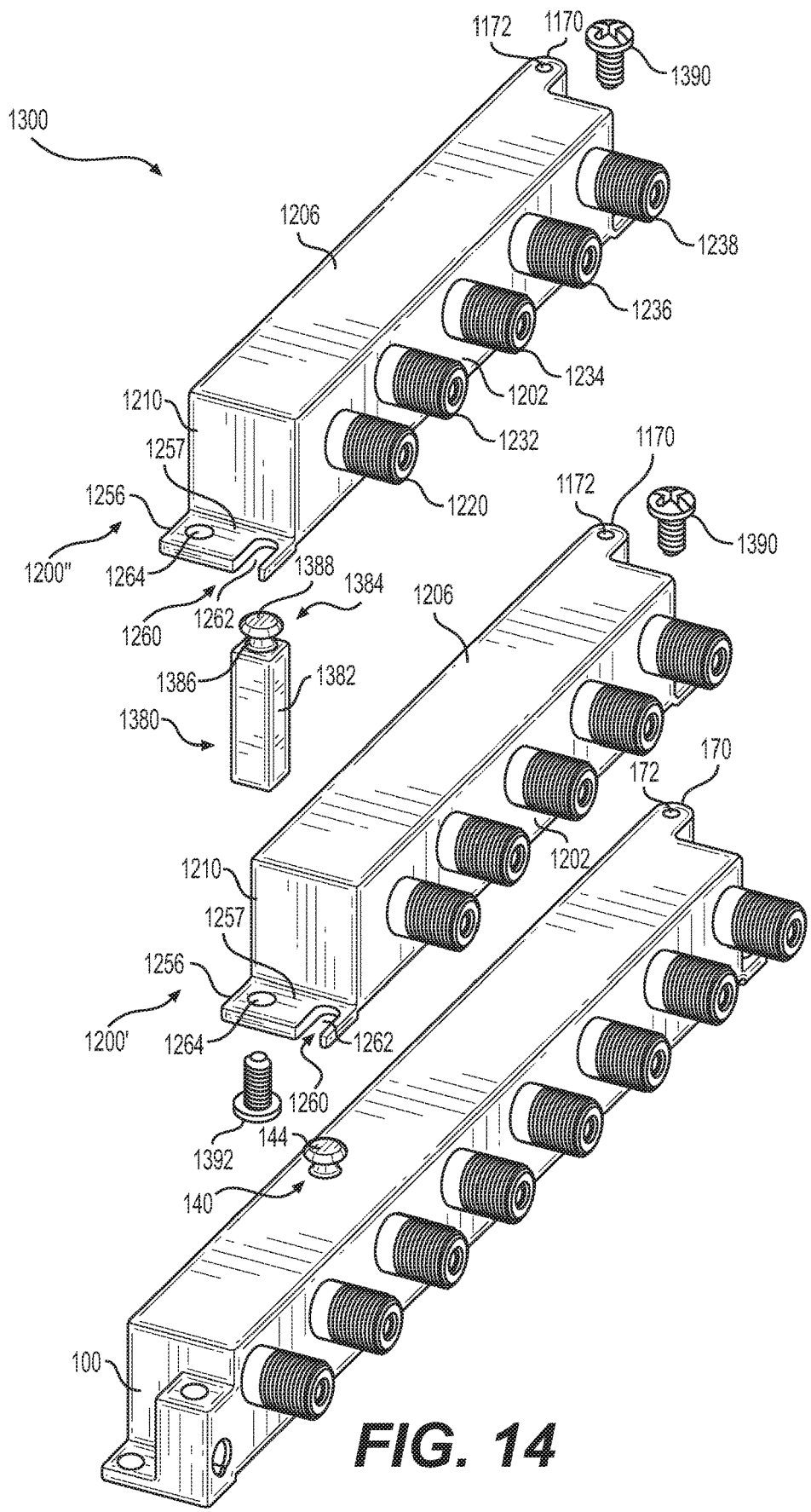
FIG. 14 is an exploded view of the modular RF device of FIG. 10
Figure 15:
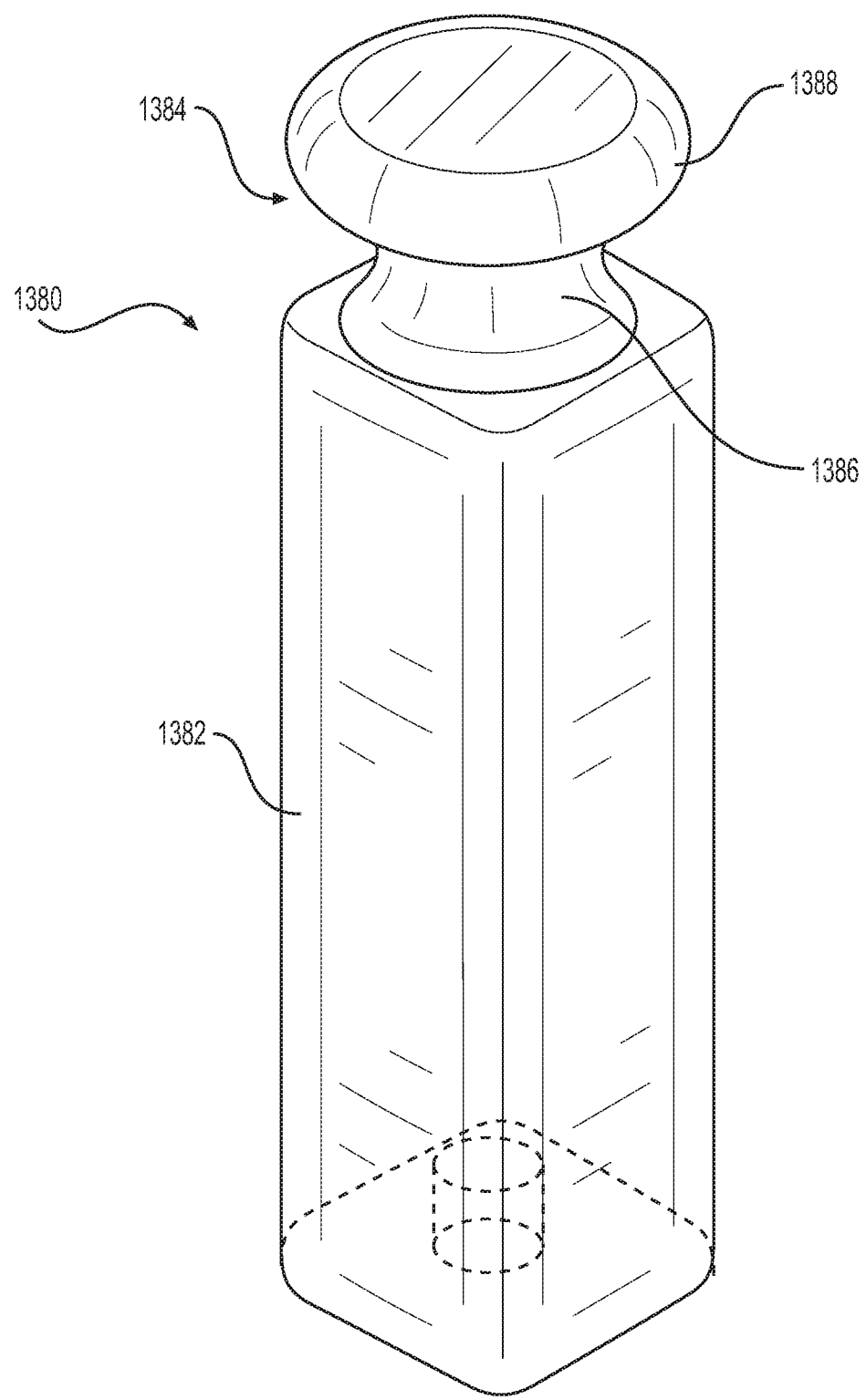
FIG. 15 is an enlarged view of the exemplary connecting post in FIG. 10.

As shown in FIGS. 10-14, an embodiment of the modular RF device 1300 includes a connecting post 1380 configured to couple two passive expansion modules 1200 to one another. The post 1380 includes a column 1382 having a length that matches a vertical distance from the top surface 1257 of the first flange portion 1256 to the top surface 1206 of the passive expansion module 1200, as shown in FIG. 13. As best illustrated in FIG. 15, the post 1380 includes a male connecting member 1384 extending upward from the top of the column 1382. The male connecting member 1384 includes a stem 1386 with an enlarged head 1388 at the end of the stem 1386 opposite to the column 1382. The post 1380 allows, in theory, an unlimited number of expansion modules 1200 to be mechanically coupled together.

A second flange portion 1266 extends from the second end wall 1212 proximate and parallel to the bottom surface 1208. The second flange portion 1266 includes openings 1268, 1269 configured to receive fasteners, for example, to secure the passive expansion module to a structure.

The modular RF device 300 includes the passive portal 100 and two passive expansion modules 1200 coupled together. For example, a first passive expansion module 1200' is coupled to the passive portal 100 by coupling the female connecting member 1260 of the passive expansion module 1200' with the male connecting member 140 of the passive portal 100. That is, the U-shaped notch 1262 of the female connecting member 1260 is coupled with the stem 142 of the male connecting member 140 by sliding the female connecting member 1260 in a direction orthogonal to the direction in which the stem 142 extends. The head 144 of the male connecting member 140 of the passive portal 100 is larger than the U-shaped notch 1262 such that the female connecting member 1260 cannot be removed from the male connecting member 140 by moving the female connector in the direction in which the stem 142 extends from the top surface 106.

When the passive expansion module 1200 is coupled to the passive portal 100 by coupling the female connecting member 1260 of the passive expansion module 1200 with the male connecting member 140 of the passive portal 100, the opening 1268 of the second flange portion 1266 of the passive expansion module is aligned with the opening 172 of the mounting portion 170 that ends from the second end wall 112 of the passive portal 100. A fastener 390, for example, a screw, can be inserted through the opening 1268 and screwed into the threaded opening 172 of the mounting portion 170, thereby fixedly coupling the passive expansion module 1200 to the passive portal 100. In some aspects, the opening 172 may be unthreaded, and the fastener may thread itself into the opening 172.

When a second passive expansion module 1200" is needed, the post 1380 is coupled with the first passive expansion module 1200', for example, by attaching a faster 1392 to the post 1380 through the opening 1264 in the first flange portion 1256 of the first passive expansion module 1200'. The fastener 1392 may be, for example, a screw that is configured to be received by the opening 1264 in the column 1382 of the post 1380. For example, the fastener 1392 may thread itself into the post 1384, or the post 1384 may include a threaded opening configured to receive the fastener 1392.

The second passive expansion module 1200" is coupled to the first passive expansion module 1200' by coupling the female connecting member 1260 of the second passive expansion module 1200" with the male connecting member 1384 of the post 1380. That is, the U-shaped notch 1262 of the female connecting member 1260 is coupled with the stem 1386 of the male connecting member 1384 by sliding the female connecting member 1260 in a direction orthogonal to the direction in which the stem 1386 extends. The head 1388 of the male connecting member 1384 of the post 1380 is larger than the U-shaped notch 1262 such that the female connecting member 1260 cannot be removed from the male connecting member 1384 by moving the female connecting member 1260 in the direction in which the stem 1386 extends from the top surface of column 1382.

When the second passive expansion module 1200" is coupled to the first passive expansion module 1200' by coupling the female connecting member 1260 of the second passive expansion module 1200" with the male connecting member 1384 of the post 1380, the opening 1268 of the second flange portion 1266 of the second passive expansion module 1200" is aligned with the opening 172 of the mounting portion 170 that ends from the second end wall 112 of the first passive expansion module 1200'. A fastener 390, for example, a screw, can be inserted through the opening 1268 and screwed into the threaded opening 172 of the mounting portion 170, thereby fixedly coupling the second passive expansion module 1200" to the first passive expansion module 1200'. In some aspects, the opening 172 may be unthreaded, and the fastener may thread itself into the opening 172.

In order to electrically couple the passive expansion modules 1200 with the passive portal 100, a first interconnecting cable (not shown) is run from one of the output ports 122, 124, 126, 132, 134, 136, 138 of the passive portal 100 to the input port 1220 of a first one of the passive expansion modules 1200'. A second interconnecting cable (not shown) is run from another one of the output ports of the passive portal 100 to the input port 1220 of the second one of the passive expansion modules 1200" or from one of the output ports of the first one of the expansion modules 1200' to the input port 1220 of the second one of the passive expansion modules 1200". Thus, the two ports used for the interconnecting cables are sacrificed in exchange for eight additional ports. As a result, the modular RF device 1300 provides a total of thirteen output ports, for example, five from the passive portal 100, four from the first passive expansion module 1200', and four from the second passive expansion module 1200" or six from the passive portal 100, three from the first passive expansion module 1200', and four from the second passive expansion module 1200".

In use, according to the above-described embodiments of modular RF devices 300, 1300, the bottom surface 108 of the passive RF portal 100 is mounted against the structure 900 such as, for example, a panel, wall, or the like. As best illustrated in FIGS. 2 and 12, the stacked arrangement of the mounted modular RF devices 300, 1300 according to the present disclosure provides access to all ports of the passive portal 100 and the passive expansion modules 200, 1200, with all ports (and thus all cabling) extending from the modular RF devices 300, 1300 in a same direction parallel to one another. That is, the ports of the stacked passive expansion modules 200, 1200 do not block the ports of the passive portal 100. Further, the offset stacking configuration of the modular RF devices 300, 1300 allows a user (e.g., a technician) to see labeling on the top surfaces 106, 206, 1206 of the passive portal 100 and passive expansion modules 200, 1200 that identifies the various ports (e.g., input, broadband/MoCA, MoCA-only).

The stacked arrangement of the mounted modular RF devices 300, 1300 according to the present disclosure also provides a minimized spatial footprint relative to the mounting structure 900. That is, only the bottom surface 108 of the passive RF portal 100 occupies real estate on the structure 900. And although the passive expansion modules 200, 1200 expand the spatial footprint when viewed from the top of the modular devices 300, 1300 (FIGS. 2 and 12), the footprint is only increased by portion of the passive expansion modules 200, 1200 that overlap the passive RF portal 100. Thus, the offset stacking configuration of the modular RF devices 300, 1300 minimizes the spatial footprint, while providing the advantages discussed above or that are otherwise recognized by persons of ordinary skill in the art.

Additionally, the above-described embodiments of modular RF devices 300, 1300 provide a modular RF device that permits a user to expand the number of outputs by adding a modular unit in a manner that minimizes an increase in the spatial footprint while allowing easy access to all of the ports of the modular RF device. The above-described embodiments of modular RF devices 300, 1300 also provide modular devices that include interlocking modular units that can be secured together to create an integrated larger functional block, rather than being a mere collection of discrete units. The above-described embodiments of modular RF devices 300, 1300 further provide modular devices that permit an existing user to upgrade a passive RF device by merely adding an expansion module without disrupting existing connections, thereby saving time and reducing customer inventory costs by eliminating the need to stock quantities of multiple sizes of RF devices Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A modular passive Multimedia over Coax Alliance (MoCA) apparatus configured to provide cable network connectivity to broadband devices, while connecting MoCA devices to the broadband devices, the apparatus comprising:
   a passive Radio Frequency (RF) portal that includes an input port configured to receive a cable that provides cable network connectivity and a plurality of output ports configured to receive cables that provide electrical connectivity with the broadband devices and the MoCA devices; and
   a passive RF expansion module configured to be removably coupled with the passive RF portal,
   wherein the passive RF expansion module includes an input port configured to receive a cable that provides electrical connectivity with one of the plurality of output ports of the passive RF portal and a plurality of output ports configured to receive cables that provide electrical connectivity with additional MoCA devices,
   wherein the input port and the plurality of output ports of the passive RF portal extend from a front surface of the passive RF portal, and the input port and the plurality of output ports of the passive RF expansion module extend from a front surface of the passive RF expansion module,
   wherein the passive RF portal includes a top surface and a bottom surface extending from a first pair of opposite ends of the front surface of the passive RF portal, the top surface and the bottom surface of the passive RF portal extending perpendicular to the front surface of the passive RF portal,
   wherein the bottom surface of the passive RF portal is configured to face a surface of a structure when the passive RF portal is attached to the structure,
   wherein a male connector is configured to extend from the top surface of the passive RF portal, the male connector including a stem that is configured to extend from the top surface of the passive RF portal and is terminated by an enlarged head,
   wherein the passive RF expansion module includes a top surface and a bottom surface extending from a first pair of opposite ends of the front surface of the passive RF expansion module, the top surface and the bottom surface of the passive RF expansion module extending perpendicular to the front surface of the passive RF expansion module,
   wherein the passive RF expansion module includes a first end wall and a second end wall extending from a second pair of opposite ends of the front surface of the passive RF expansion module, the first end wall and the second end wall of the passive RF expansion module extending perpendicular to the front surface, the top surface, and the bottom surface of the passive RF expansion module,
   wherein a flange having a U-shaped notch that forms a female connector is configured to extend from the first end wall of the passive RF expansion module proximate with and parallel to the bottom surface of the passive RF expansion module,
   wherein the female connector is configured to slidingly engage the stem of the male connector in a direction parallel to the top surface of the passive RF portal in order to mechanically couple the passive RF expansion module with the passive RF portal, and the head of the male connector is configured to prevent the female connector from being removed from the male connector in a direction perpendicular to the top surface of the passive RF portal, wherein the passive RF portal includes a first end wall and a second end wall extending from a second pair of opposite ends of the front surface of the passive RF portal, the first end wall and the second end wall of the passive RF portal extending perpendicular to the front surface, the top surface, and the bottom surface of the passive RF portal, wherein a mounting portion is configured to extend from the second end wall of the passive RF portal proximate and parallel to the top surface of the passive RF portal, wherein a second flange is configured to extend from the second end wall of the passive RF expansion module proximate with and parallel to the bottom surface of the passive RF expansion module, and wherein the mounting portion and the second flange are configured to receive a fastener for fixedly coupling the passive RF expansion module to the passive RF portal.

2. The apparatus of claim 1, further comprising:

a second passive RF expansion module configured to be removably coupled with the first passive RF expansion module; and a post configured to couple the second passive RF expansion module with the passive RF expansion module, wherein the second passive RF expansion module includes an input port and a plurality of output ports configured to receive cables that provide electrical connectivity with further additional MoCA devices, the input port being configured to receive a cable that provides electrical connectivity with either one of the plurality of output ports of the passive RF portal or one of the plurality of output ports of the passive RF expansion module, wherein the input port and the plurality of output ports of the second passive RF expansion module extend from a front surface of the second passive RF expansion module, wherein the post is configured to be removably coupled with the flange of the passive RF expansion module and includes a column and a second male connector, the second male connector including a stem that is configured to extend from a top surface of the column and is terminated by an enlarged head, wherein the second passive RF expansion module includes a top surface and a bottom surface extending from a first pair of opposite ends of the front surface of the second passive RF expansion module, the top surface and the bottom surface of the second passive RF expansion module extending perpendicular to the front surface of the second passive RF expansion module, wherein the second passive RF expansion module includes a first end wall and a second end wall extending from a second pair of opposite ends of the front surface of the second passive RF expansion module, the first end wall and the second end wall of the second passive RF expansion module extending perpendicular to the front surface, the top surface, and the bottom surface of the second passive RF expansion module, wherein a second female connector is configured to extend from the first end wall of the second passive RF expansion module proximate with and parallel to the bottom surface of the second passive RF expansion module, wherein the second female connector is configured to slidingly engage the stem of the second male connector in a direction parallel to the top surface of the passive RF expansion module in order to mechanically couple the second passive RF expansion module with the passive RF expansion module, and the head of the second male connector is configured to prevent the second female connector from being removed from the second male connector in a direction perpendicular to the top surface of the passive RF expansion module, wherein a second mounting portion is configured to extend from the second end wall of the passive RF expansion module proximate and parallel to the top surface of the passive RF expansion module, wherein a third flange is configured to extend from the second end wall of the second passive RF expansion module proximate with and parallel to the bottom surface of the second passive RF expansion module, and wherein the second mounting portion and the third flange are configured to receive a fastener for fixedly coupling the second passive RF expansion module to the passive RF expansion module.

3. The apparatus of claim 1, wherein the passive RF expansion module is configured to partially overlap the top surface of the passive RF portal and partially overhang the top surface of the passive RF portal when the passive RF expansion module is mechanically coupled with the passive RF portal such that the front surface of the passive RF expansion module is offset from the front surface of the passive RF portal when view from a direction of the top surface of the passive RF portal, and wherein the input port and the output ports of the passive RF expansion module and the input port and the output ports of the passive RF portal are configured to extend parallel to one another.

4. A modular passive radio frequency (RF) apparatus, comprising:

a passive RF portal that includes an input port configured to receive cable network connectivity and a plurality of output ports configured to provide electrical connectivity with a plurality of broadband devices and a plurality of Multimedia over Coax Alliance (MoCA) devices; and a passive RF expansion module configured to be removably coupled with the passive RF portal, wherein the passive RF expansion module includes an input port configured to receive electrical connectivity with one of the plurality of output ports of the passive RF portal and a plurality of output ports configured to provide electrical connectivity with additional MoCA devices, wherein the input port and the plurality of output ports of the passive RF portal extend from a front surface of the passive RF portal, and the input port and the plurality of output ports of the passive RF expansion module extend from a front surface of the passive RF expansion module, the front surface of the passive RF portal and the front surface of the passive RF expansion module facing in a same direction, wherein the passive RF portal includes a top surface and a bottom surface that are parallel to one another and perpendicular to the front surface of the passive RF portal, wherein a male connector is configured to extend from the top surface of the passive RF portal, wherein the passive RF expansion module includes a top surface and a bottom surface that are parallel to one another and perpendicular to the front surface of the passive RF expansion module, wherein the passive RF expansion module includes a first end wall and a second end wall that are parallel to one another and perpendicular to the front surface, the top surface, and the bottom surface of the passive RF expansion module, wherein a female connector is configured to extend from the first end wall of the passive RF expansion module, and wherein the female connector is configured to slidingly engage the male connector in a direction parallel to the top surface of the passive RF portal in order to mechanically couple the passive RF expansion module with the passive RF portal, and the male connector is configured to prevent the female connector from being removed from the male connector in a direction perpendicular to the top surface of the passive RF portal.

5. The modular passive RF apparatus of claim 4, wherein the passive RF portal includes a first end wall and a second end wall extending from a second pair of opposite ends of the front surface of the passive RF portal, the first end wall and the second end wall of the passive RF portal extending perpendicular to the front surface, the top surface, and the bottom surface of the passive RF portal, wherein a mounting portion is configured to extend from the second end wall of the passive RF portal, wherein a flange is configured to extend from the second end wall of the passive RF expansion module, and wherein the mounting portion and the flange are configured to receive a fastener for fixedly coupling the passive RF expansion module to the passive RF portal.

6. The modular passive RF apparatus of claim 4, wherein the male connector includes a stem that is configured to extend from the top surface of the passive RF portal and is terminated by an enlarged head, and a flange at includes a U-shaped notch that forms the female connector, and wherein the female connector is configured to slidingly engage the stem of the male connector in a direction parallel to the top surface of the passive RF portal in order to mechanically couple the passive RF expansion module with the passive RF portal, and the head of the male connector is configured to prevent the female connector from being removed from the male connector in a direction perpendicular to the top surface of the passive RF portal.

7. The modular passive RF apparatus of claim 4, further comprising:

a second passive RF expansion module configured to be removably coupled with the passive RF expansion module; and a post configured to couple the second passive RF expansion module with the passive RF expansion module, wherein the second passive RF expansion module includes an input port and a plurality of output ports configured to receive cables that provide electrical connectivity with further additional MoCA devices, the input port being configured to receive a cable that provides electrical connectivity with either one of the plurality of output ports of the passive RF portal or one of the plurality of output ports of the passive RF expansion module, wherein the input port and the plurality of output ports of the second passive RF expansion module extend from a front surface of the second passive RF expansion module, wherein the post is configured to be removably coupled with a flange of the passive RF expansion module and includes a column and a second male connector, wherein the second passive RF expansion module includes a top surface and a bottom surface extending from a first pair of opposite ends of the front surface of the second passive RF expansion module, the top surface and the bottom surface of the second passive RF expansion module extending perpendicular to the front surface of the second passive RF expansion module, wherein the second passive RF expansion module includes a first end wall and a second end wall extending from a second pair of opposite ends of the front surface of the second passive RF expansion module, the first end wall and the second end wall of the second passive RF expansion module extending perpendicular to the front surface, the top surface, and the bottom surface of the second passive RF expansion module, wherein a second female connector is configured to extend from the first end wall of the second passive RF expansion module, and wherein the second female connector is configured to slidingly engage the second male connector in a direction parallel to the top surface of the passive RF expansion module in order to mechanically couple the second passive RF expansion module with the passive RF expansion module, and the second male connector is configured to prevent the second female connector from being removed from the second male connector in a direction perpendicular to the top surface of the passive RF expansion module.

8. The modular passive RF apparatus of claim 7, wherein the second male connector includes a stem that is configured to extend from a top surface of the column and is terminated by an enlarged head, wherein the second female connector includes a U-shaped notch configured to slidingly engage the stem of the second male connector in a direction parallel to the top surface of the passive RF expansion module in order to mechanically couple the second passive RF expansion module with the passive RF expansion module, and the head of the second male connector is configured to prevent the second female connector from being removed from the second male connector in a direction perpendicular to the top surface of the passive RF expansion module.

9. The apparatus of claim 7, wherein a second mounting portion is configured to extend from the second end wall of the passive RF expansion module, wherein a second flange is configured to extend from the second end wall of the second passive RF expansion module, and wherein the second mounting portion and the second flange are configured to receive a fastener for fixedly coupling the second passive RF expansion module to the passive RF expansion module.

10. A modular passive Radio Frequency (RF) apparatus comprising:

a passive RF portal having a top surface and a bottom surface; and a passive RF expansion module configured to be removably coupled with the passive RF portal, wherein a male connector is configured to extend from the top surface of the passive RF portal in a direction opposite relative to the bottom surface, and a female connector is configured to extend from an end wall of the passive RF expansion module, and wherein the female connector is configured to slidingly engage the male connector in a direction parallel to the top surface of the passive RF portal in order to mechanically couple the passive RF expansion module with the passive RF portal, and the male connector is configured to prevent the female connector from being removed from the male connector in a direction perpendicular to the top surface of the passive RF portal.

11. The modular passive RF apparatus of claim 10, wherein the passive RF portal includes an input port configured to receive cable network connectivity and a plurality of output ports configured to provide electrical connectivity with at least one broadband device and at least one Multimedia over Coax Alliance (MoCA) device;

wherein the passive RF expansion module includes an input port configured to receive electrical connectivity from one of the plurality of output ports of the passive RF portal and a plurality of output ports configured to provide electrical connectivity with at least one additional MoCA device, wherein the input port and the plurality of output ports of the passive RF portal extend from a front surface of the passive RF portal, and the input port and the plurality of output ports of the passive RF expansion module extend from a front surface of the passive RF expansion module, wherein the top surface and the bottom surface are parallel to one another and perpendicular to the front surface of the passive RF portal, wherein the passive RF expansion module includes a top surface and a bottom surface that are parallel to one another and perpendicular to the front surface of the passive RF expansion module, wherein the passive RF expansion module includes the end wall and a second end wall that are parallel to one another and perpendicular to the front surface, the top surface, and the bottom surface of the passive RF expansion module, and wherein the female connector is configured to slidingly engage the male connector in a direction parallel to the top surface of the passive RF portal in order to mechanically couple the passive RF expansion module with the passive RF portal, and the male connector is configured to prevent the female connector from being removed from the male connector in a direction perpendicular to the top surface of the passive RF portal.

12. The modular passive RF apparatus of claim 11, wherein the male connector includes a stem that is configured to extend from the top surface of the passive RF portal and is terminated by an enlarged head.

13. The modular passive RF apparatus of claim 12, wherein the female connector is configured to slidingly engage the stem of the male connector in a direction parallel to the top surface of the passive RF portal in order to mechanically couple the passive RF expansion module with the passive RF portal, and the head of the male connector is configured to prevent the female connector from being removed from the male connector in a direction perpendicular to the top surface of the passive RF portal.

14. The modular passive RF apparatus of claim 12, wherein a flange is configured to extend from the end wall of the passive RF expansion module and includes a U-shaped notch that forms the female connector.

15. The modular passive RF apparatus of claim 10, wherein the passive RF expansion module is configured to partially overlap the top surface of the passive RF portal and partially overhang the top surface of the passive RF portal when the passive RF expansion module is mechanically coupled with the passive RF portal such that the front surface of the passive RF expansion module is offset from the front surface of the passive RF portal when view from a direction of the top surface of the passive RF portal, and wherein the input port and the output ports of the passive RF expansion module and the input port and the output ports of the passive RF portal are configured to extend parallel to one another.

16. The modular passive RF apparatus of claim 10, wherein the passive RF portal includes the end wall and a second end wall that are parallel to one another and perpendicular to a front surface, the top surface, and the bottom surface of the passive RF portal, wherein a mounting portion is configured to extend from the second end wall of the passive RF portal, wherein a flange is configured to extend from the second end wall of the passive RF expansion module, and wherein the mounting portion and the flange are configured to receive a fastener for fixedly coupling the passive RF expansion module to the passive RF portal.

17. The modular passive RF apparatus of claim 10, further comprising:

a second passive RF expansion module configured to be removably coupled with the first passive RF expansion module; and a post configured to couple the second passive RF expansion module with the passive RF expansion module, wherein the second passive RF expansion module includes an input port and a plurality of output ports configured to provide electrical connectivity with at least one further additional MoCA device, the input port being configured to receive electrical connectivity from either one of the plurality of output ports of the passive RF portal or one of the plurality of output ports of the passive RF expansion module, wherein the input port and the plurality of output ports of the second passive RF expansion module extend from a front surface of the second passive RF expansion module, wherein the post is configured to be removably coupled with the passive RF expansion module, wherein the second passive RF expansion module includes a top surface and a bottom surface that are parallel to one another and perpendicular to the front surface of the second passive RF expansion module, wherein the second passive RF expansion module includes a first end wall and a second end wall that are parallel to one another and perpendicular to the front surface, the top surface, and the bottom surface of the second passive RF expansion module, wherein a second female connector is configured to extend from the first end wall of the second passive RF expansion module, and wherein the second female connector is configured to slidingly engage the second male connector in a direction parallel to the top surface of the passive RF expansion module in order to mechanically couple the second passive RF expansion module with the passive RF expansion module, and the second male connector is configured to prevent the second female connector from being removed from the second male connector in a direction perpendicular to the top surface of the passive RF expansion module.

18. The modular passive RF apparatus of claim 17, wherein a flange is configured to extend from the end wall of the passive RF expansion module, and wherein the post is configured to be removably coupled with the flange of the passive RF expansion module and includes a column and a second male connector, the second male connector including a stem that is configured to extend from a top surface of the column and is terminated by an enlarged head.

19. The modular passive RF apparatus of claim 18, wherein the female connector includes a U-shaped notch configured to slidingly engage the stem of the second male connector in a direction parallel to the top surface of the passive RF expansion module in order to mechanically couple the second passive RF expansion module with the passive RF expansion module, and the head of the second male connector is configured to prevent the second female connector from being removed from the second male connector in a direction perpendicular to the top surface of the passive RF expansion module.

20. The modular passive RF apparatus of claim 19, wherein a second mounting portion is configured to extend from the second end wall of the passive RF expansion module,
  wherein a second flange is configured to extend from the second end wall of the second passive RF expansion module, and
  wherein the second mounting portion and the second flange are configured to receive a fastener for fixedly coupling the second passive RF expansion module to the passive RF expansion module.

* * * * *